Nov. 30, 1937. J. M. MACPHERSON ET AL 2,100,563
BRAKE APPLYING AND EQUALIZING MECHANISM FOR MOTOR CARS
Filed March 18, 1936
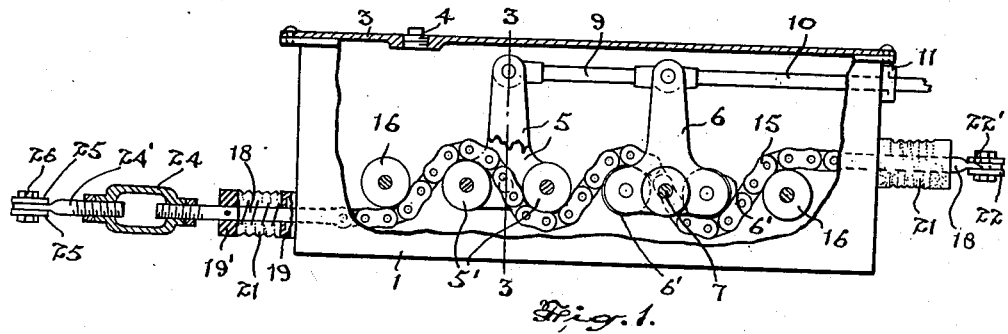
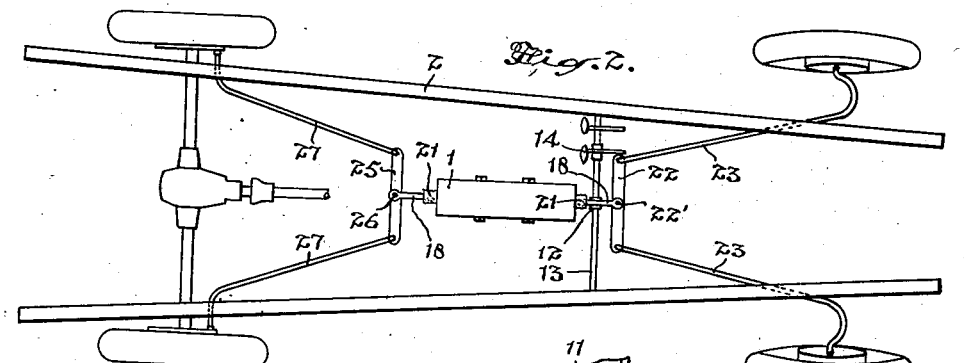
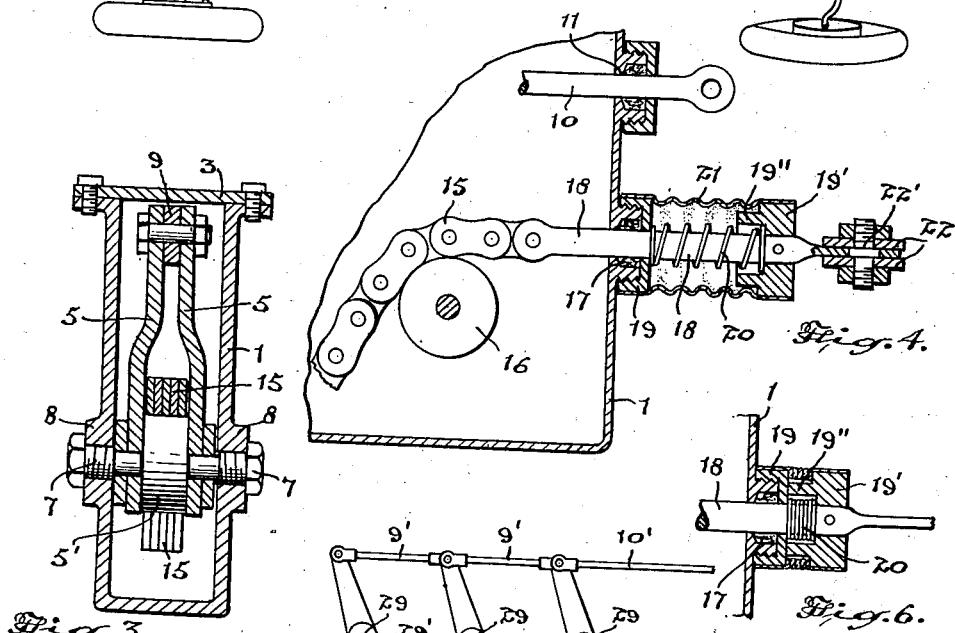
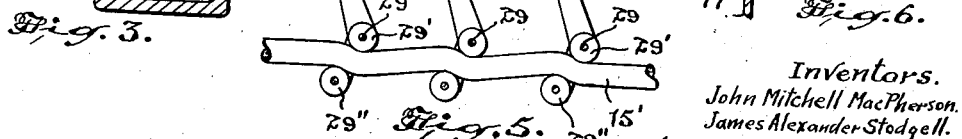
Inventors.
John Mitchell MacPherson.
James Alexander Stodgell.

Patented Nov. 30, 1937

2,100,563

UNITED STATES PATENT OFFICE 2,100,563

BRAKE APPLYING AND EQUALIZING MECHANISM FOR MOTOR CARS

John Mitchell Macpherson and James Alexander Stodgell, North Bay, Ontario, Canada Application March 18, 1936, Serial No. 69,500

7 Claims. (Cl. 188—204)

The principal object of this invention is to provide an improved form of equalized brake-applying mechanism particularly suitable for motor cars which may be operated with ease to apply a powerful and uniform braking pressure to all of the wheels and to provide a construction in which the operating parts will be fully protected against the harmful influences of road dirt.

A further and important object is to eliminate the dangers incident to the partial failure of the braking mechanism, so that the function of the other part of the braking mechanism will be unaffected.

The principal feature of the invention resides in the novel construction and arrangement of parts whereby two or more equalizing levers under the control of the foot pedal, emergency brake lever, or both, are directly associated with a flexible connection between the front and rear sets of brakes, so that when the levers are swung the common flexible connection will be distorted laterally at a plurality of points to exert a powerful braking influence on the front and rear set of brakes simultaneously.

A further and important feature resides in the novel arrangement of the equalizing levers within a sealed oil chamber through which the flexible means extends and in the provision of sealed entries for operating extensions of the flexible member to prevent the entry of road dirt into the sealed oil chamber.

Other features of importance will be apparent as the description proceeds.

In the drawing, Figure 1 is a side elevational view partly broken away showing a preferred form of our improved mechanism.

Figure 2 is a somewhat diagrammatic plan view of a motor under-carriage structure illustrating the application of the present invention thereto.

Figure 3 is a sectional elevation taken on the line 3—3 of Figure 1 (enlarged).

Figure 4 is an enlarged sectional detail of one end portion of the sealed casing showing the manner of sealing the outlet through which the operating extension of the flexible member projects.

Figure 5 is a diagrammatic illustration of a modified form of lever arrangement for distorting the flexible member.

Figure 6 is an elevational detail of one of the sealing means showing how the stop member will function to limit the inward movement of the respective end of the flexible member on failure of the associated braking means.

Various forms of equalized brake-applying mechanisms have been proposed for effecting the simultaneous braking of the front and rear wheels and the present invention is directed to an improved form of braking mechanism for this purpose, which will overcome defects associated with former mechanisms.

In the preferred form of the invention an oil casing 1 is provided which is adapted to be mounted centrally of the chassis 2 and a cover 3 is removably secured to the open side to permit access to the interior, a suitable oil plug 4 being shown for replenishing the oil supply in the casing.

A pair of inverted T-shaped levers 5 and 6 are pivotally mounted in the casing on studs 7 which are threaded inwardly from opposite sides of the casing through the bosses 8.

Each lever is shown as of paired construction as seen in Figure 3 and paired rollers 5' and 6' are rotatably supported between the spaced head portions of the T-shaped levers in spaced relation as best seen in Figure 1.

The upper ends of the levers 5 and 6 are operatively connected with a link member 9 and an operating rod 10 extends from the upper end of the lever 6 and extends through a sealed opening 11 in the end wall of the casing and in the present case the rod 10 is shown connected with a crank 12 carried by the rotatable crank bar 13 on which the brake pedal 14 is mounted.

A flexible member, here shown as a length of roller chain 15, is threaded between the sets of rollers 5' and 6' in the manner shown and roller bearings 16 are mounted within the casing at each end to guide the end portions of the flexible member 15 into alignment with the offset openings 17 and short operating rod extensions 18 connected with the end of the flexible member 15, extend through the openings 17 and packing glands 19 form an oil seal about the rods.

Each of the rods 18 has a stop member 19' mounted thereon and compression springs 20 encircle the rods and bear outwardly against the stop members 19' to normally urge the flexible member and rods toward a neutral or balanced position and a flexible bellows 21 is secured about the packing gland 19 at one end and about the stop member 19' at the other end so that dirt or ice will be prevented from fouling the rods 18 with their encircling springs and providing for free movement of the members 19 toward the casing.

It will be seen on reference to Figure 1 that a pull on the brake-operating rod 10 will simultaneously swing the levers 5 and 6 and since each lever effects a double distortion of the flexible member 15, an amplified shortening of the effective length of the flexible member will be achieved with a smooth, powerful motion with a slight movement of the rod 10, so that the rods 18 will be drawn inwardly with an equal force.

An equalizing bar 22, here shown of paired formation, is secured centrally to the outer end of the right hand rod 18 with a pivot connection 22' and brake rods 23 connect the outer ends of the bar 22 with the brakes of the front wheels.

The outer end of the left hand rod 18 is provided with an adjustable turn-buckle 24 having a threaded extension 24' and paired equalizing bars 25 are pivotally connected at 26 to the outer end of the extension 24' and brake rods 27 extend from the outer end of the equalizing bar 25 to the rear brakes.

Thus the operation of the levers 5 and 6 imparts a uniform brake-applying force to each of the rods 23 and 27 and since the main operating members are enclosed in a bath of lubricating oil within the casing 1 and roller contacts are provided, the motion will be free and easy.

In the event of one of the rods 23 or 27, or one of the equalizing bars becoming broken or detached, the associated stop member 19 will simply be drawn inwardly until the projecting portion 19'' contacts solidly with the member 19, as shown in Figure 6, so that further movement of the braking levers 5 and 6 will impart an accelerated braking movement to the opposite rod 18, thus effectively applying the brake through the non-defective brake connections.

In the modified showing of Figure 5, a triple arrangement of levers 28 of substantial L form are provided with fixed pivot points 29, about which rollers 29' are mounted and the short ends of the levers carry rollers 29''.

The flexible member 15', here shown in the form of a cable, is threaded between the paired rollers of each of the triple levers and the longer ends of the levers are pivotally connected by links 9' and an operating extension 10' leads therefrom to be actuated by the foot pedal or hand lever, or both.

It has been previously proposed to distort a flexible brake-operating member by the operation of a single pivotal lever, but it is found that by providing a multiple arrangement of operating levers which are simultaneously actuated, a more sensitive and powerful operation of the brakes is achieved and the wear and strain will be effectively distributed over a multiplicity of bearing or thrust areas, so that greater efficiency and longer life is achieved.

What we claim as our invention is:—

1. A brake-applying mechanism comprising the combination with the brakes to be applied and a flexible operating element interposed therebetween, of a plurality of lever members mounted with their axes spaced parallelly apart in the direction of the length of said flexible operating element, means carried by said plurality of levers for effecting the lateral distortion of said flexible member at a plurality of points in the length thereof on the swinging of said levers, and means for swinging said plurality of levers in unison including an operating connection between said respective levers, whereby an amplified brake-applying force is obtained with a slight displacement only of said levers and with the minimum lateral distortion of said flexible element at any one point.

2. A brake-applying mechanism comprising a unit adapted for mounting on a car chassis between the front and rear sets of brakes, a plurality of levers parallelly disposed pivotally mounted on said unit on fixed axes spaced parallelly apart in a common plane and having spaced rollers mounted thereon, a flexible member threaded back and forth across said common plane over and under the rollers of one of said levers and over and under the rollers of the next adjacent lever and having operative connections at the ends coupled respectively with the front and rear sets of brakes, and means for simultaneously operating said plurality of levers each with a uniform motion to distort said flexible member to opposite sides of said common plane about said plurality of rollers, whereby an amplified brake-applying displacement of said projecting extensions is achieved.

3. The combination with front and rear sets of brakes to be operated, of an actuating unit therefor, comprising, a casing, brake levers of inverted T-shaped form pivotally mounted in said casing with their axes spaced apart in a common plane, each lever having rollers mounted in spaced relation on the transverse head portion of the T-shaped levers, a flexible element threaded between said rollers back and forth across said common plane, rod extensions from the ends of said flexible element slidably mounted in said casing and extending therefrom in offset relation and disposed respectively on opposite sides of said common plane, said rods being connected respectively with the front and rear sets of brakes, thrust means co-operating with said flexible element adjacent said rod extensions for protecting said rod extensions against lateral thrusts, and means for actuating said levers simultaneously each with a uniform angular motion to distort said flexible element laterally within said casing and thereby apply an amplified brake-applying movement to said rods.

4. A brake-applying mechanism comprising the combination with the brakes to be applied and a flexible operating element connected therewith, of a housing for said element formed with paired threaded bosses in the sides oppositely disposed, lever members within said casing for exerting lateral pressure contact on said flexible element to distort the same into brake-applying configuration, stud members threaded into said threaded bosses from opposite sides of the casing and extending into bearing support contact with said levers at opposite sides, and means connecting said levers to effect their simultaneous operation.

5. In a brake-applying mechanism in which a flexible element connected with the brakes is adapted to be distorted to apply the brakes, means for distorting said flexible element including a lever pivotally mounted and formed of two separate sections spaced axially to receive the flexible element therebetween, and roller contact members mounted between the respective sections of said lever, a pin extending through and operatively connecting said respective lever sections at a point spaced from the axis thereof, and a primary brake-applying member pivotally linked to said connecting pin.

6. In a brake-applying mechanism in which a flexible element connected with the brakes is adapted to be distorted to apply the brakes, means for distorting said flexible element comprising, a series of levers pivotally mounted at spaced points in the length of said flexible element, rollers concentrically encircling the pivot axes of said levers for positioning contact with one side of the flexible element at spaced points, thrust rollers mounted on said levers at spaced points from the pivot axes thereof and adapted on swinging of said levers to swing in concentric paths about the axes of the first-mentioned rollers in lateral thrust contact with the other side of said flexible element to bend said element about the several first-mentioned rollers, and means for operatively linking said series of levers to effect the simultaneous angular displacement thereof about their several axes.

7. Means as claimed in claim 3 in which all of said lever rollers are normally positioned with their axes substantially aligned with the lever axes and disposed substantially in said common plane therewith, said thrust means comprising guide rollers mounted in fixed positions at the points where the flexible element passes outwardly beyond the outermost rollers of said levers and supporting said rods and the adjacent portions of said flexible element against the lateral thrust set up thereon in the operation of said levers.

JOHN MITCHELL MACPHERSON.
JAMES ALEXANDER STODGELL.